United States Patent [19]

Mueller

[11] 4,153,502
[45] May 8, 1979

[54] PROCESS FOR THE PRODUCTION OF POLYSULPHIDE PULPING LIQUOR FROM PULP MILL RECOVERY SMELT

[75] Inventor: Walter A. Mueller, Dorval, Canada

[73] Assignee: Corrosion Service Company Limited, Toronto, Canada

[21] Appl. No.: 901,589

[22] Filed: May 1, 1978

[30] Foreign Application Priority Data

May 6, 1977 [GB] United Kingdom ............... 19210/77

[51] Int. Cl.² .......................... D21C 1/00; D21C 3/02; D21C 3/24; D21C 11/04
[52] U.S. Cl. ........................................ 162/17; 162/19; 162/30 R; 162/30 K; 162/33; 162/34; 162/35; 162/82; 162/86; 423/DIG. 3
[58] Field of Search ...................... 162/30 R, 30 K, 33, 162/34, 35, 82, 17, 19, 86; 423/566, DIG. 3, 182, 183, 207, 562

[56] References Cited

U.S. PATENT DOCUMENTS

| | | | |
|---|---|---|---|
| 2,967,758 | 1/1961 | Thorson | 423/562 |
| 3,216,887 | 11/1965 | Landmark | 462/82 |
| 3,323,858 | 6/1967 | Guerrieri | 162/30 R |
| 3,331,733 | 7/1967 | Venemark | 423/562 |
| 3,560,329 | 2/1971 | Nelson et al. | 162/30 R |
| 3,761,568 | 9/1973 | Brink et al. | 423/562 |
| 3,860,479 | 1/1975 | Barker et al. | 423/562 |
| 3,874,991 | 4/1975 | Kleppe | 162/82 |
| 3,950,217 | 4/1976 | Reeve | 162/30 K |
| 3,954,552 | 5/1976 | Lukes et al. | 162/30 K |
| 4,024,229 | 5/1977 | Smith et al. | 423/562 |

Primary Examiner—S. Leon Bashore
Assistant Examiner—Peter F. Kratz
Attorney, Agent, or Firm—Sim & McBurney

[57] ABSTRACT

Sodium polysulphide is formed by reacting sodium sulphide and sodium sulphur-oxygen salts in the presence of carbon and oxygen. The invention is particularly applicable to reacting recovery furnace smelt from a polysulphide pulping process to form a mixture of sodium polysulphide and sodium carbonate which is substantially free from sodium sulphur-oxygen salts, so that dead-load sulphidity is substantially eliminated from the pulping liquor.

18 Claims, 2 Drawing Figures

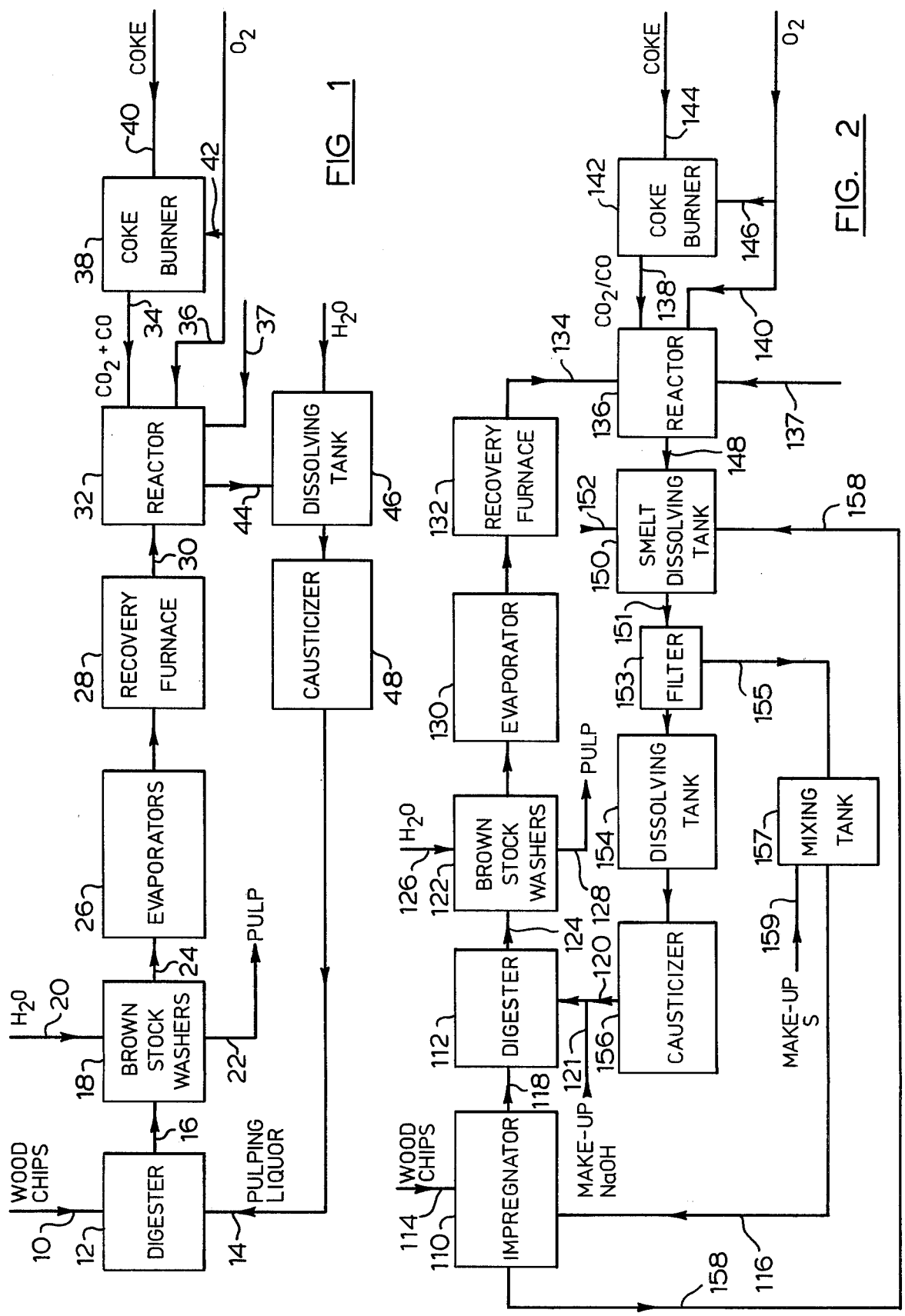

PROCESS FOR THE PRODUCTION OF POLYSULPHIDE PULPING LIQUOR FROM PULP MILL RECOVERY SMELT

FIELD OF INVENTION

The present invention is directed to the production of polysulphide pulping liquor.

BACKGROUND TO THE INVENTION

In conventional Kraft mill pulping of cellulosic fibrous material, generally wood, sodium sulphide and sodium hydroxide are used as the active pulping chemicals. In addition, the white liquor usually contains sulphur-oxygen-salts, such as, sodium sulphate, sodium thiosulphate and sodium sulphite. The sulphur-oxygen salts take no part in the pulping process and represent a dead load which cycles within the system. Only about 60 to 70% of the total sulphur content of the white liquor is present as the pulpingly-active sodium sulphide.

It is known that polysulphide cooking of wood has advantages over the conventional Kraft mill cooking, including an increased yield in pulp recoverable from the wood, usually up to 10% on pulp, improved pulp freeness with a consequently decreased energy requirement for pulp beating, and decreased corrosion.

Various suggestions have been made for the production of polysulphide pulping liquor and one of the recent suggestions is to oxidize the sodium sulphide contained in white liquor and utilization of the resulting liquor as the pulping liquor. While this procedure is successful in converting some sodium sulphide to sodium polysulphide, sodium sulphide also is oxidized to sodium thiosulphate and the fraction of the total sulphur of the pulping liquor which is present as sodium polysulphide is quite limited, rarely exceeding about 20% of the total sulphur. This pulping liquor, therefore, contains a high proportion of the total sulphur as pulpingly-inert sulphur-oxygen salts.

The limited polysulphide content of the pulping liquor is a considerable drawback since the liquor has a high sulphidity, which leads to sulphur emissions and a high chemical make-up requirement.

SUMMARY OF INVENTION

In accordance with the present invention, there is provided a method of producing sodium polysulphide liquor having a substantially decreased sodium sulphur-oxygen salts content and preferably a higher polysulphide to sulphide ratio, as compared to conventional processes. For a delignifying capacity equal to the prior art polysulphide pulping liquors, the sulphidity of the liquor may be substantially decreased, thereby leading to decreased sulphur emissions and decreased make-up requirement.

GENERAL DESCRIPTION OF INVENTION

The method of this invention involves the treatment of recovery furnace smelt to obtain a mixture of sodium polysulphide and sodium carbonate from which sodium sulphur-oxygen salts are substantially absent. The recovery furnace in a conventional Kraft mill process and in a polysulphide process is used to burn off organic material from spent pulping liquor to form sodium carbonate from sodium hydroxide in the spent liquor and to convert make-up chemical to sodium sulphide. In a typical recovery furnace smelt, the sulphur content thereof is present about 70 to 80% by weight as sodium sulphide and about 20 to 30% by weight as sodium sulphate and sodium sulphite. Some sodium polysulphide may be present but sodium thiosulphate is usually absent in view of its instability at the high temperatures experienced in the recovery furnace.

In this invention, a high temperature reaction of smelt components is effected in the presence of a balance of oxygen and carbon to conform stoichiometrically with the sodium and sulphur present to achieve the overall reaction represented by the partial equation:

$$Na + S + O + C \rightarrow Na_2S_{(1+x)} + Na_2CO_3 \qquad (1)$$

wherein x represents the polysulphide sulfur and is at least greater than about 0.4 and preferably greater than about 0.6 up to about 1.0.

The overall reactions for the various sulphur components involved, assuming the x=1 maximum situation, are represented by the following equations:

$$\tfrac{1}{2}O_2 + 2Na_2S + CO_2 \rightarrow Na_2S_2 + Na_2CO_3$$

$$Na_2SO_4 + 7Na_2S + 4CO_2 \rightarrow 4Na_2S_2 + 4Na_2CO_3$$

$$Na_2SO_3 + 5Na_2S + 3CO_2 \rightarrow 3Na_2S_2 + 3Na_2CO_3$$

The reactions which are involved, therefore, in the method of this invention include the simultaneous reduction of the sulphur-oxygen ionic species to polysulphide and oxidation of the sulphide ionic species to polysulphide. The method produces sodium polysulphide and sodium carbonate which, in the preferred embodiment, is substantially free from dead load sulphur-oxygen salts, so that the proportion of the sulphur available for use in the pulping process is considerably increased over conventional polysulphide procedures.

Further, if the same or a similar concentration of polysulphide is required as in the prior art polysulphide processes, the overall sulphidity of the pulping liquor may be considerably decreased, with consequential advantages of decreased sulphur emissions and decreased make-up chemical requirement.

The advantages of greater pulp yield, decreased corrosion and greater pulp freeness characteristic of polysulphide pulping also are realized in this invention.

The smelt treatment process may be effected in any desired manner. In one preferred embodiment of the invention, the smelt, preferably in the molten state directly from the furnace, is reacted in a controlled atmosphere comprising carbon and oxygen in the form of carbon dioxide, carbon monoxide and/or oxygen or dry air. Elemental carbon may be added to the smelt if further reduction is required.

The proportions of carbon and oxygen contacting the smelt are preferably selected to provide a stoichiometric ratio of sodium and sulphur in the smelt to oxygen and carbon in contact with the smelt to form to equation (1) above, so that all the sulphur-oxygen ionic species will be converted to polysulphide.

A closed reactor preferably is used in this embodiment to minimize side reactions and the reactor may be pressurized, if desired.

Gas by-products resulting from this procedure may be returned to the recovery furnace to remove sulphurous materials therefrom in order to minimize atmospheric pollution.

In another preferred embodiment, the smelting procedure in the recovery furnace is permitted to proceed only partially to completion, so that uncombusted carbon remains in the smelt. This uncombusted carbon is used in this embodiment for the reduction of the sulphur-oxygen ionic species and may be supplemented with additional carbon, if required. A gaseous atmosphere, comprising carbon dioxide, carbon monoxide and/or oxygen or air, need be used in this procedure only, and if necessary, to overcome the effect of the variation of smelt composition on the formation of polysulphide.

The latter procedure is beneficial in that a faster furnace throughput is possible and furnace capacity requirements are decreased.

The smelt treatment procedure of the invention is generally carried out at a temperature of about 650° to about 1000° C., preferably about 700° to about 800° C. With increased polysulphide content, the melting point of the smelt drops strongly.

Any make-up chemicals, such as, sodium sulphur-oxygen salts, for example, sodium sulphate and/or sodium carbonate, and/or at least part of the precipitator dust from the precipitators through which the furnace flue gas stream passes may be added to the smelt prior to effecting the method of the invention.

Alternatively, make-up chemical requirements may be provided by elemental sulphur and caustic soda which are incorporated into the pulping chemicals.

The product which is formed by the present invention consists essentially of sodium polysulphide and sodium carbonate, the sodium carbonate arising both from reaction of spent pulping liquor, sodium hydroxide in the furnace and from the oxidation-reduction reactions effected on the sulphurous ionic species in the smelt. While this product preferably is substantially free from sulphur-oxygen ionic species, small quantities thereof may be present as a result of incomplete reaction.

The sodium carbonate content of this product is substantially completely causticized to sodium hydroxide and the resulting pulping liquor is recycled to wood digestion. The causticization reaction may be effected directly on the product, or the product may first be fractionated into a polysulphide-rich aqueous fraction and a residual sodium carbonate-rich fraction, which then is causticized to sodium hydroxide.

When the latter product-fractionation procedure is adopted, the polysulphide-rich phase may be used in a polysulphide impregnation step of the pulping process, the partially-depleted polysulphide-rich phase may be recycled to the smelt dissolving tank to be enriched in polysulphide, and the sodium hydroxide solution resulting from the causticization may be used in a subsequent cooking step of the pulping process.

The product fractionation may be achieved by leaching the product to dissolve the sodium polysulphide therefrom and leave most of the sodium carbonate in the solid phase. The product leaching may be effected over a wide range of temperature, generally in the range of about 60° to about 120° C. Prior to leaching, the product may be reduced by grinding or shattering to promote the efficiency of the leaching operation.

BRIEF DESCRIPTION OF DRAWINGS

FIG. 1 is a schematic flow sheet of a polysulphide based pulp mill system embodying the present invention; and FIG. 2 is a schematic flow sheet of an alternative polysulphide based pulp mill system embodying the process of the invention.

DESCRIPTION OF PREFERRED EMBODIMENTS

Referring first to the embodiment of FIG. 1, wood chips are fed by line 10 to a digester 12 to which regenerated polysulphide pulping liquor is fed by line 14. The pulp formed in the digester 12 is passed by line 16 to brown stock washers 18 in which the pulp is washed by wash water fed by line 20. The pulp resulting from the washing is forwarded by line 22 for further processing.

The black liquor containing the spent wash water is passed by line 24 to black liquor evaporators 26 before passage to a recovery furnace 28. In accordance with the present invention, the smelt from the furnace 28 is passed by line 30 to a reactor 32 to which carbon dioxide and/or carbon monoxide are fed by line 34, to which oxygen or dry air may be fed by line 36, and to which make-up chemical and/or precipitator dust are fed by line 37.

The gases fed by lines 34 and 36 are proportioned to achieve the stoichiometry of equation (1) above and form a mixture of sodium carbonate and $Na_2S_{1+x}$ where x is preferably at least about 0.6 up to about 1.0.

A mixture of carbon dioxide and carbon monoxide fed by line 34 is formed in a coke burner 38 wherein coke fed by line 40 is burned in a fluidized bed with oxygen or dry air fed by line 42 to provide the desired relative proportions of carbon dioxide and carbon monoxide, ranging from 100% carbon dioxide to 100% carbon monoxide. When carbon monoxide is present in the gases entering the reactor 32, oxygen is usually not fed to the reactor 32 to avoid explosive reaction with the carbon monoxide.

The product mixture resulting from the reactor 32 is passed by line 44 to a smelt dissolving tank 46 from whence the smelt solution passes to a causticizer 48 for conversion of the sodium carbonate content of the product mixture to sodium hydroxide. The liquor in the dissolving tank 46 and the causticizer 48 is maintained under an inert atmosphere to minimize oxidation of the polysulphide to inert salts. The inert atmosphere conveniently may be provided by steam used first for shattering the smelt. The pulping liquor resulting from the causticizer 48 is recycled by line 14 to the digester 12.

Referring now to FIG. 2, in this embodiment an impregnator 110 is positioned prior to a digester 112. Wood chips, initially steamed or soaked in water and fed to the impregnator 110 by line 114, are impregnated with regenerated sodium polysulphide solution fed by line 116. The impregnated chips are passed to the digester 112 by line 118 for digestion in regenerated sodium hydroxide liquor fed by line 120.

The pulp resulting from the digester 112 is passed to brown stock washers 122 by line 124 for washing with water fed by line 126. Washed pulp is removed by line 128 for further processing.

The black liquor from the brown stock washers 122 passes through evaporator 130 to a recovery furnace 132. The smelt from the recovery furnace 132 is passed by line 134 to a reactor 136 to which precipitator dust is also fed by line 137.

Carbon dioxide and/or carbon monoxide are fed to the reactor 136 by line 138 while oxygen or dry air may be fed thereto by line 140. The gases fed by lines 138 and 140 are proportioned to achieve the stoichiometry of equation (1) above and form a mixture of sodium carbonate and $Na_2S_{1+x}$ where x is preferably about 0.6 to about 1.0.

A mixture of carbon dioxide and carbon monoxide is formed in a coke burner 142 wherein coke fed by line 144 is burned in a fluidized bed with oxygen or dry air fed by line 146 to provide the desired relative proportions of carbon dixoide and carbon monoxide, ranging from 100% carbon dioxide to 100% carbon monoxide. When carbon monoxide is fed to the reactor 136, oxygen feed thereto usually is avoided.

The mixture of sodium carbonate and sodium polysulphide formed in the reactor 136 is passed by line 148 to a smelt dissolving tank 150 wherein it is shattered by steam or the like and leached by an aqueous medium fed by line 152 and by partially depleted polysulphide liquor fed by line 158 to dissolve sodium polysulphide. The resulting slurry, consisting of a solution composed mainly of sodium polysulphide and solid crystals consisting mainly of sodium carbonate, is passed by line 151 to a filter 153 where the liquid phase is separated from the suspended crystals. An inert atmosphere, preferably of steam, is provided in both the smelt dissolving tank 150 and in the filter 153 to inhibit oxidation of the sodium polysulphide to inert sulphur-oxygen salts. The liquid containing most of the sodium polysulphide of the product mixture in line 148 is fed by line 155 to a mixing tank 157 to which make-up sulphur may be added by line 159.

The resulting sodium polysulphide-rich solution having only a small dissolved sodium carbonate content is forwarded by line 116 to the impregnator 110. The residual solid phase, consisting mainly of sodium carbonate, is passed to a dissolving tank 154 and thence to a causticizer 156 for conversion of sodium carbonate to sodium hydroxide. The resulting sodium hydroxide solution having a low dissolved sodium polysulphide content, along with make-up caustic soda added by line 121 then are forwarded by line 120 to the digester 112.

Excess sodium polysulphide-rich liquor from the impregnator 110 is recycled by line 158 to the smelt leacher-dissolving tank 150 for use as part of the leach liquor therein.

EXAMPLE

A tube furnace was equipped with two coaxial alumina tubes, the inner one of which was used as a reactor while the outer one was open to atmosphere. Boats of impervious alumina, placed in the centre of the furnace, were used to hold mixtures of sodium sulphide, sodium sulphate, sodium sulphite and sodium carbonate to simulate various possible recovery furnace smelt compositions. The experiments were initiated by purging moisture from the reactor with nitrogen gas at about 150° C.

Active carbon was added to some mixtures and gas mixtures comprising $CO_2$ and $CO_2 + \frac{1}{2}O_2$ were passed through the heated inner reactor tube. The quantity of polysulphide sulphur was determined in each case. The results are reproduced in the following Table:

Table

| Experiment No. | Compounds | Quantity M mols | Gas Feed | Conditions Time (min) | Temp (°C) | $S^= + S°$ % | Products Recovered S° % | $S_{(1+x)}$ [1] |
|---|---|---|---|---|---|---|---|---|
| 1. | $Na_2S.9H_2O$ | 20 | $CO_2+O_2$ | 30 | 750 | 86.7 | 29.3 | 1.51 |
|  | $Na_2CO_3$ | 10 |  |  |  |  |  |  |
| 2. | $Na_2S.9H_2O$ | 10 | $CO_2$ | 30 | 850 | 85.1 | 31.3 | 1.58 |
|  | $Na_2SO_3$ | 2 |  |  |  |  |  |  |
|  | $Na_2CO_3$ | 2 |  |  |  |  |  |  |
| 3. | $Na_2S.9H_2O$ | 9 | $CO_2$ | 30 | 750 | 85.5 | 32.1 | 1.60 |
|  | $Na_2SO_3$ | 3 |  |  |  |  |  |  |
|  | $Na_2CO_3$ | 2 |  |  |  |  |  |  |
| 4. | $Na_2S.9H_2O$ | 27 | $CO_2$ | 30 | 750 | 70.5 | 24.2 | 1.52 |
|  | $Na_2SO_4$ | 9 |  |  |  |  |  |  |
|  | $Na_2CO_3$ | 6 |  |  |  |  |  |  |

Note: [1] In $Na_2S_{1+x}$

The results reproduced in the above Table show that various sodium sulphur-oxygen salts and sodium sulphide mixtures may be converted to sodium polysulphide.

SUMMARY

The present invention, therefore, provides a novel method for the production of sodium polysulphide which does not result in a high proportion of pulpingly-inert sodium sulphur-oxygen salts and is capable of substantially eliminating such species from the liquor. Modifications are possible within the scope of the invention.

What I claim is:

1. A method of forming sodium polysulphide and sodium carbonate, which comprises subjecting a pulp mill recovery smelt mixture of sodium sulphide, sodium carbonate and at least one sodium sulphur-oxygen salt selected from sodium sulphate, sodium sulphite and mixtures thereof to a high temperature oxidation-reduction reaction at a temperature of about 650° to about 1000° C. in the presence of sufficient carbon and additional oxygen to conform stoichiometrically with the sodium and sulphur present in said mixture to achieve the overall reaction represented by the partial equation:

$$Na + S + O + C \rightarrow Na_2S_{(1+x)} + Na_2CO_3$$

wherein x is at least about 0.4 and to form a mixture of sodium polysulphide and sodium carbonate substantially free from sodium sulphur-oxygen salts; and recovering said mixture of sodium polysulphide and sodium carbonate.

2. The method of claim 1 wherein said reaction is effected at a temperature of about 700° to about 800° C.

3. The method of claim 1 wherein x is at least about 0.6.

4. A method of forming pulp of cellulosic fibrous material, which comprises:
    subjecting said cellulosic fibrous material to pulping using a pulping liquor containing sodium polysulphide and sodium hydroxide as the active pulping chemicals,
    separating pulp formed thereby from spent pulping liquor, subjecting spent pulping liquor to furnacing to form a smelt comprising sodium sulphide, sodium carbonate and at least one sodium sulphur-oxygen salt selected from sodium sulphate, sodium sulphite and mixtures thereof, subjecting said smelt to an oxidation-reduction reaction at a temperature of about 650° to about 1000° C. in the presence of sufficient carbon and additional oxygen to conform stoichiometrically with the sodium and sulphur present in said smelt to achieve the overall reaction represented by the partial equation:

$$Na + S + O + C \rightarrow Na_2S_{(1+x)} + Na_2CO_3$$

where x is at least about 0.4, to form a mixture comprising sodium polysulphide and sodium carbonate substantially free from sodium sulphur-oxygen salts, recovering said mixture comprising sodium polysulphide and sodium carbonate substantially free from sodium sulphur-oxygen salts from said reaction, converting at least a major proportion of said sodium carbonate in said mixture to sodium hydroxide, and recycling said sodium polysulphide and said sodium hydroxide in the form of at least one aqueous solution thereof to said pulping step.

5. The method of claim 4 wherein said oxidation-reduction reaction is effected at a temperature of about 700° to about 800° C. and x is at least about 0.6.

6. The method of claim 4, or 5 wherein said oxidation-reduction reaction is effected in a closed reactor and said oxygen and carbon are provided by at least one reactant selected from the group consisting of solid elemental carbon, gaseous carbon dioxide, gaseous carbon monoxide and gaseous oxygen.

7. The method of claim 4, or 5 wherein said furnacing step is incompletely effected to leave residual unburned carbon in said smelt and said residual unburned carbon is used as at least part of said carbon reactant.

8. The method of claim 4, or 5 wherein said mixture comprising sodium polysulphide and sodium carbonate is formed into an aqueous solution thereof prior to said conversion of sodium carbonate to sodium hydroxide, and said sodium polysulphide and sodium hydroxide are recycled as a single aqueous solution.

9. The method of claim 8 wherein said aqueous solution formation and sodium carbonate conversion steps are effected in a substantially inert atmosphere to inhibit oxidation of said sodium polysulphide.

10. The method of claim 9 wherein said inert atmosphere is provided by steam.

11. The method of claim 4, or 5 wherein, prior to said conversion of sodium carbonate to sodium hydroxide, said mixture comprising sodium polysulphide and sodium carbonate is fractionated into a sodium polysulphide-rich aqueous phase and a sodium carbonate-rich solid phase, and said sodium carbonate-rich solid phase is formed into an aqueous solution thereof for said conversion step, and said sodium polysulphide and sodium hydroxide are recycled to said pulping step as separate aqueous solutions thereof.

12. The method of claim 11 wherein said pulping step is effected by first impregnating said cellulosic fibrous material in said sodium polysulphide solution and then digesting said cellulosic fibrous material in said sodium hydroxide solution.

13. The method of claim 12 wherein excess sodium polysulphide solution from said impregnation step is recycled to said fractionation step.

14. The method of claim 11 wherein said fractionation is achieved by leaching said mixture with an aqueous medium at a temperature of about 60° to about 120° C. to dissolve substantially all of said sodium polysulphide values from said mixture and leave said solid sodium carbonate, and separating the resulting liquid and solid phases.

15. The method of claim 14 wherein said leaching and separation steps are effected in a substantially inert atmosphere to inhibit oxidation of said sodium polysulphide.

16. The method of claim 15 wherein said inert atmosphere is provided by steam.

17. The method of claim 4, or 5 wherein any make-up chemicals in the form of sodium sulphur-oxygen salts are added to said smelt prior to said oxidation-reduction reaction.

18. The method of claim 4, or 5 wherein, prior to said recycle, any make-up chemical in the form of elemental sulphur is added to said sodium polysulphide-containing solution and in the form of said sodium hydroxide is added to said sodium hydroxide-containing solution.

* * * * *